March 23, 1954  F. LUSTIG  2,673,059
POWER TOOL HOLDING BRACKET
Filed June 14, 1950
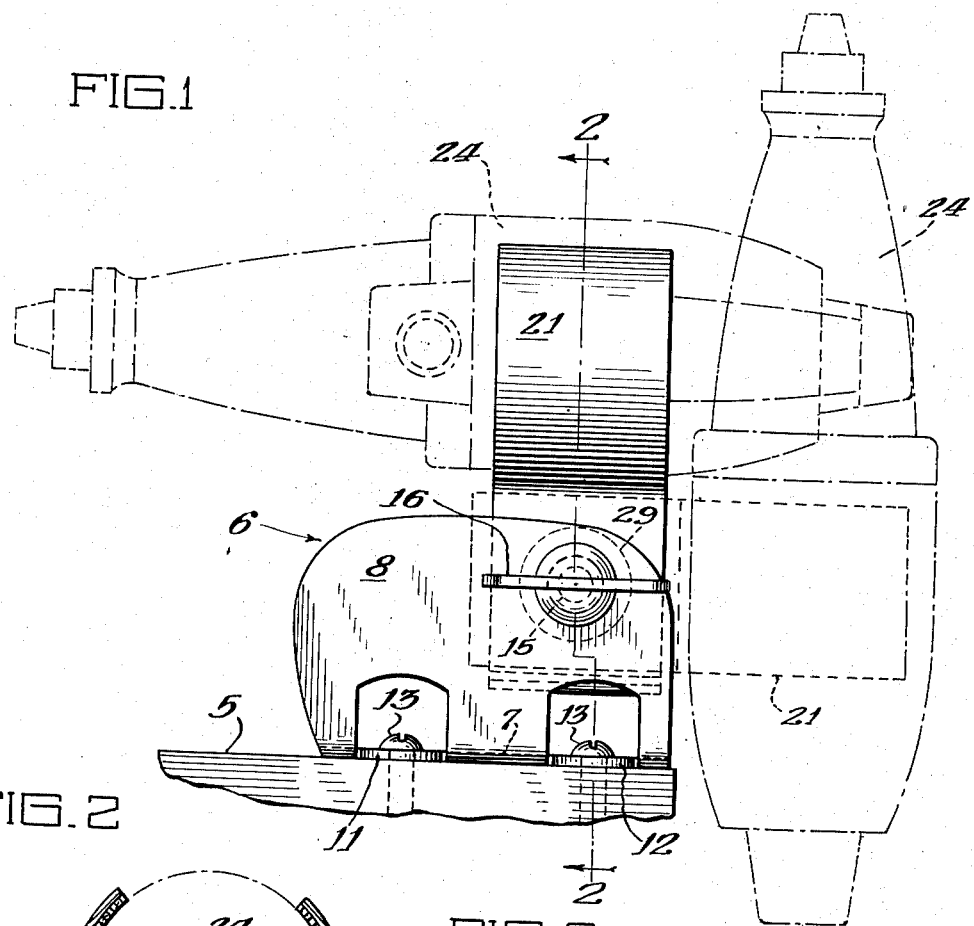
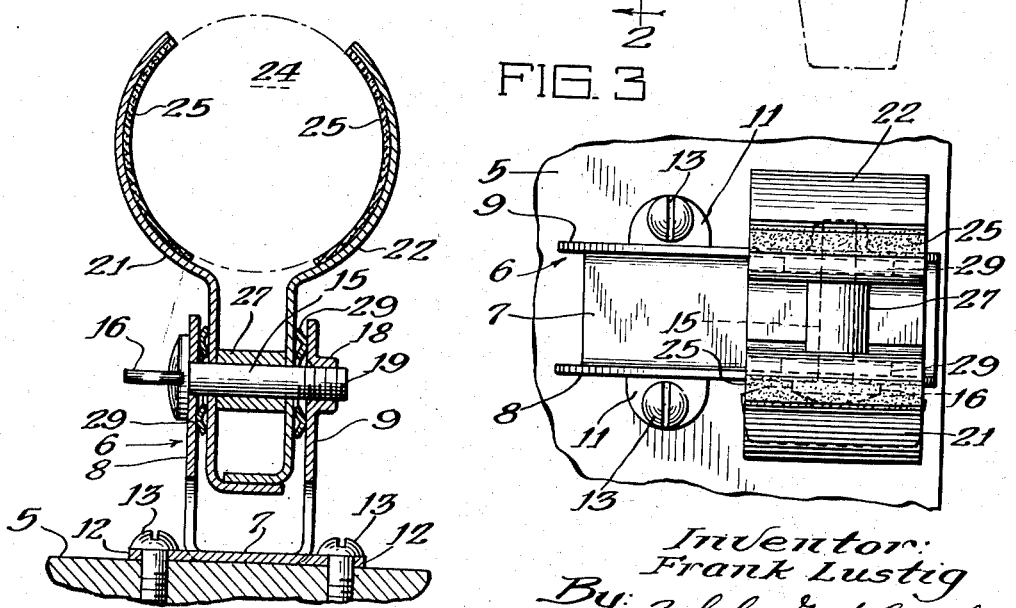
Inventor:
Frank Lustig
By: Zabel & Gritzbaugh
Attorneys Patented Mar. 23, 1954

2,673,059

UNITED STATES PATENT OFFICE 2,673,059

POWER TOOL HOLDING BRACKET

Frank Lustig, Chicago, Ill., assignor to Excel Auto Radiator Company, Chicago, Ill., a corporation of Delaware Application June 14, 1950, Serial No. 167,971

1 Claim. (Cl. 248—316)

My invention relates to a bracket for holding a small power tool in convenient, working position. The power tool with which my bracket may be used is of the electric motor driven type wherein the motor is contained within the casing of the tool. Tools of this character are used with drills, buffers, grinders and the like for small operations.

One object of my invention is to provide a holding bracket for such a tool that may easily be attached to a plane surface such as a table top.

Another object is to provide a bracket having a clamping member that embraces the tool and holds it securely through the agency of a frictional relation.

Another object contemplates that the clamping member is mounted in such a manner in the bracket that the tool may be pivoted through a substantial angular range, whereby the tool may be positioned most conveniently for performing desired work.

Another object is to provide a bracket of this character having one adjusting element that easily may be actuated to vary the angular position of the tool, the adjustment being made without losing complete frictional engagement between the tool and the clamping member, or losing complete frictional relation between the clamping member and the bracket portion to which the member is pivotally attached.

Still another object is to provide a bracket that is simple in construction, inexpensive, and one that will have a long, useful life.

Other objects and advantages of the invention will be apparent as the description proceeds, reference being had to the accompanying drawing which illustrates one structural form of the invention. It is to be understood, of course, that in a practical, commercial application of the invention various details might well vary somewhat from those here shown and described.

In the drawing:

Fig. 1 is a view in side elevation of my improved bracket showing in broken lines a power tool mounted therein, the power tool and associated bracket portion being shown in alternative positions;

Fig. 2 is a sectional view on line 2—2 of Fig. 1, and

Fig. 3 is a top view of the bracket.

Referring to the drawing, my improved bracket is shown attached to a plane surface such as a table 5 near one edge thereof.

The bracket has a base portion consisting of a channel member 6, the channel member having a web 7 and two plane legs 8 and 9. The channel member has means adapted to attach web 7 to table 5, said means including spaced lugs 11 and 12 which lie in the plane of web 7, as clearly shown in the drawing. Suitable screws or bolts 13 pass through openings in the lugs to secure channel member 6 to the table.

The upper portion of channel legs 8 and 9 have a pair of aligned openings through which pass a transverse bolt 15 (Fig. 2). Bolt 15 preferably has a wing device 16 for ease in turning, the wing device being shown at the head end of the bolt, although it equally well could be applied to a nut at the other end of the bolt. In the absence of a nut, one of the openings may be surrounded by a boss 18 which is provided with internal threads to receive the threaded end 19 of the bolt. Tightening of the bolt is effective to draw the channel legs toward each other a sufficient amount to cooperate with a clamping member presently to be described.

Bolt 15 carries within channel legs 8 and 9 a U-shaped clamping member consisting of two opposed arms 21 and 22, the portion of the arms extending outside of channel member 6 being suitably shaped to embrace a portion of a power tool 24 (broken lines). In the form of the invention illustrated, the extending ends of arms 21 and 22 are arcuate in shape so as to embrace a circular portion of the power tool, although it is apparent that other suitable cooperating shapes could be used.

The shaped ends of arms 21 and 22 are preferably lined with a high friction material 25, such as rubber, felt, or the like, so as to provide a good friction relationship between the arms of the clamping member and the tool 24.

A cylindrical spacer 27 may desirably be carried on bolt 15 between arms 21 and 22 of the clamping member, while a washer 29, preferably of the lock type, is located between each arm and the adjacent leg of channel member 6. Washers 29 impart a desirable degree of friction between the U-shaped clamping member and the channel legs 8 and 9 so that moderate adjustment of bolt 15 will enable the member to be pivoted, or fixed in rigid position, as desired.

It is apparent that the pivoting adjustment may be made without completely losing the frictional relations in the bracket that are necessary to maintain good control over the relatively heavy power tool. On the other hand, when bolt 15 is tightened, the clamping member is rigidly maintained in set position in the bracket, and the tool is securely held in the member, thus accomplishing the purpose for which the bracket is intended in a highly satisfactory manner. The tool may, of course, easily be removed from the bracket by extended loosening of bolt 15 when it is so desired.

From the above description it is thought that the construction and advantages of my invention will be readily apparent to those skilled in the art. Various changes in detail may be made without departing from the spirit or losing the advantages of the invention.

Having thus described my invention, what I claim as new and desire to secure by Letters Patent is:

A power tool holding bracket comprising a channel member having means adapted to attach the web thereof to a plane surface, said means including spaced lugs carried by the channel member and lying in the plane of the web, the channel legs having a pair of aligned openings, one of which is threaded, a transverse bolt extending through said openings whereby the legs may be drawn together by bolt action, a pair of opposed arms carried by said bolt between said channel legs and extending outside of said channel member, the extending ends of said arms being shaped to embrace a circular portion of a power tool in a clamping manner, said arm ends being lined with a friction material, a spacer carried on said bolt between said arms, and a lock type washer between each arm and the adjacent channel leg.

FRANK LUSTIG.

References Cited in the file of this patent

UNITED STATES PATENTS

| Number | Name | Date |
|---|---|---|
| 992,338 | Carpenter et al. | May 16, 1911 |
| 1,236,456 | Long | Aug. 14, 1917 |
| 1,277,479 | Ritchie | Sept. 3, 1918 |
| 1,333,258 | Kahl | Mar. 9, 1920 |
| 1,841,806 | Harris | Jan. 19, 1932 |
| 2,074,136 | Welch | Mar. 16, 1937 |
| 2,535,586 | McElroy | Dec. 26, 1950 |